March 21, 1967 H. LEYSIEFFER 3,310,740

DIRECTIONAL RADIO SYSTEM WITH ANGLE MODULATION

Filed Sept. 10, 1963

3,310,740

DIRECTIONAL RADIO SYSTEM WITH ANGLE MODULATION

Hans Leysieffer, Munich-Solln, Germany, assignor to Siemens & Halske Aktiengesellschaft Berlin and Munich, a corporation of Germany Filed Sept. 10, 1963, Ser. No. 307,943
Claims priority, application Germany, Sept. 19, 1962, S 81,528
5 Claims. (Cl. 325—2)

Figure 1:
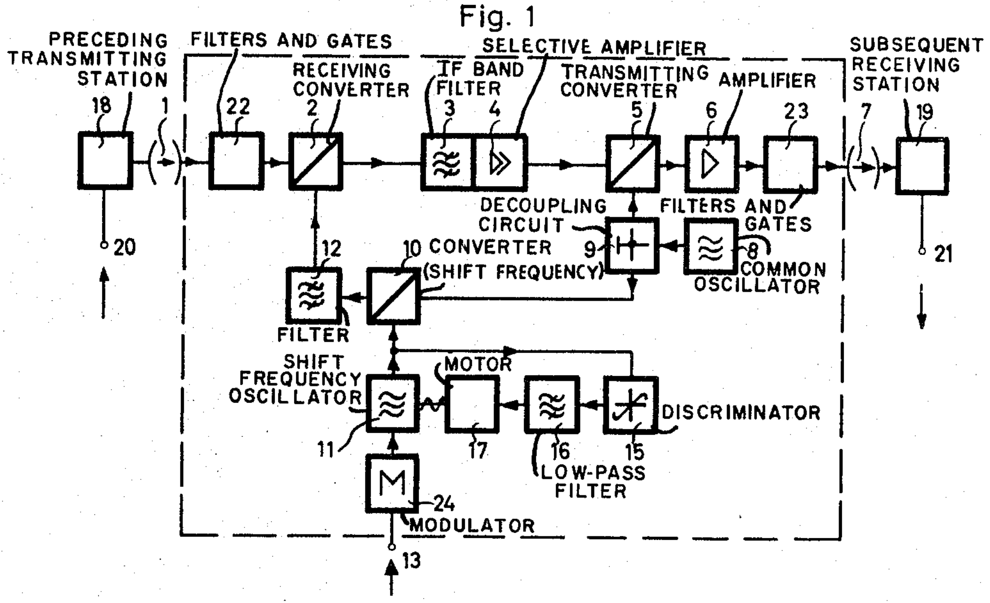

The present invention relates to a directional radio system with angle modulation. The expression "angle modulation," is understood to encompass all types of modulation in which frequency and/or phase of a high-frequency carrier wave are modulated in accordance with an intelligence signal. In radio systems of this type, there are frequently provided intermediate stations, since the radio field lengths normally obtainable are in themselves not sufficient to bridge over long distances.

In the intermediate stations employed in such systems, the received oscillations are by means of a receiving converter transformed into an intermediate frequency, amplified in this intermediate frequency and fed to a transmitting converter in which they are converted into the transmitting oscillations. The conversion oscillations for the receiving converter and the transmitting converter are as a rule derived from a common oscillator. The two conversion oscillations are shifted in phase with respect to each other by a predetermined frequency value (shifter frequency), by inserting a further frequency converter into the feed line for the converter oscillation to one of the converters, such further frequency converter being fed from a shifter-frequency oscillator. The insertion of the shifter-frequency oscillator requires that the latter be of high constancy.

Moreover, it is in practice frequently necessary, particularly when there are concerned directional wide-band radio systems or links, to supply additional intelligence to the transmission from the intermediate stations. This requirement can as such be satisfied by effecting in the intermediate station not only a conversion into the intermediate frequency, but a conversion down to the baseband and by adding the additional intelligence to the baseband with the aid of methods known from the carrier frequency art. While this procedure is feasible, it has two essential disadvantages. On the one hand, the required apparatus expenditure is relatively high, since such intermediate stations require, in both the receiver and in the transmitter, supplementary devices for the baseband. On the other hand, the frequency conversion down to the baseband results in additional noise in the transmission path, so that the requirements as to the signal-to-noise level must be in part undesirably increased in order to maintain a given value in the overall system at the other parts of the apparatus. This also results in a considerable increase in the apparatus expenditure.

The object of the present invention is to make it possible, in a directional radio link of the type described above, to effect the insertion of additional intelligence in the transmission from the intermediate stations, for instance from telephone channels, or from television channels, in a substantially simpler manner and in particular, in such a way that the increase in noise occurring in the known procedure is substantially avoided.

In accordance with the invention, this object is achieved in connection with a directional radio system with angle modulation, which contains at least one intermediate station, in which the receiving oscillations are converted by a receiving converter into an intermediate frequency, amplified in said frequency and fed to a transmitting converter, for conversion therein into transmitting oscillations, and in which the conversion oscillations for the receiving converter and the transmitting converter are derived from a common oscillator, whereby the two conversion oscillations are shifted in phase with respect to each other by a predetermined frequency value (shifter frequency), and wherein another frequency converter is connected in the conversion frequency feed to one of the converters, which other frequency converter is fed with another conversion oscillation from a shifter-frequency oscillator, maintaining free, in the baseband of the section preceding the intermediate station, a frequency range, and so constructing the shifter oscillator of the intermediate station converned that it can be frequency modulated with additional intelligence, the frequency of which corresponds to the frequency range of the baseband which is maintained free, providing a frequency regulator for the shifter-frequency oscillator, feeding to said regulator, as input voltage, oscillations in the frequency of which is also included the frequency of the shifter-frequency oscillator, and feeding from these oscillations the frequency regulation voltage for the shifter frequency oscillator to the actual frequency regulating member of the shifter-frequency oscillator, via a frequency discriminator and a low-pass filter, with the cutoff frequency of said low-pass filter being lower than the lowest frequency of the baseband in the directional radio system.

It is in this connection advantageous to keep the portion of lowest frequency of the baseband free, in the portion of the link preceding the intermediate station, for the intelligence which is to be additionally fed at the intermediate station. The expenditure for carrier frequency devices for the feeding of the additional intelligence can in this manner be kept particuluarly small since in the carrier frequency systems customary at the present time, the additional intelligence is mostly supplied via cable and in the lower frequency position.

The invention will be described below in further detail with reference to the accompanying drawing showing by way of example an embodiment thereof.

Figure 2:
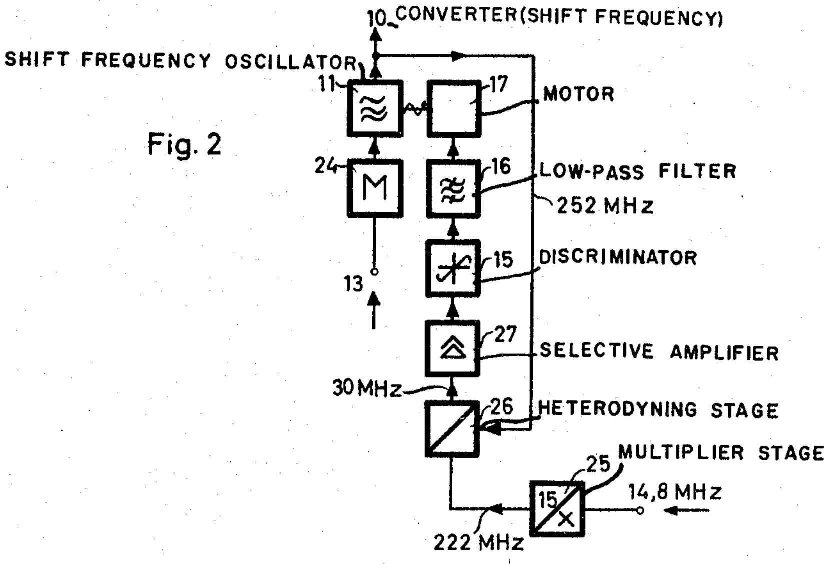

FIG. 1 shows a radio link or system with frequency modulation, which is operative to transmit a baseband, the frequency range of which corresponds, for instance, to that of 1800 telephone channels. Such systems are also known as wide-band broadcasting or radio links or systems; and FIG. 2 shows a particularly advantageous embodiment of a frequency-stable regulator circuit for an oscillator.

The directional radio system comprises, for instance, a transmitting station 18 with the corresponding terminal devices into which the baseband is fed via the feed line 20. This baseband is to be transmitted to the "receiving" terminal station 19 and which is also provided with the customary terminal devices for recovery of the baseband which is available for further utilization via the terminal 21. Only one intermediate station is provided in the illustrated embodiment, although several such stations can be present over the overall distance, some of them also without the additional feeding of intelligence in accordance with the invention.

The intermediate station is indicated in detail in block diagram manner and framed by a dashed line. The antennas for the "transmitting" terminal station, the "receiving" terminal station and the intermediate stations are merely schematically indicated by numerals 1 and 7. In the intermediate station the radio frequency signals received via the antenna are fed via filters and gates—which are for the sake of simplicity merely schematically indicated by numeral 22—to a receiving converter 2 which serves for the conversion of these oscillations from radio frequency into an intermediate frequency. For example, the radio frequency can be in the 6 gigacycle region and the intermediate frequency in the region around 70 megacycles. The intermediate frequency oscillations are taken from the receiving converter via the band filter 3 and fed to a selective intermediate frequency amplifier 4. The amplified intermediate frequency oscillations are fed into the transmitting converter 5 and transposed therein to the radio frequency. The transmitting oscillations of the intermediate station are at this frequency as a rule again selectively amplified and then fed via customary filters and gates 23 to the transmitting antenna of the intermediate station to be transmitted to he next radio field. The frequency position of the radio frequency oscillations at the output of the transmitting converter 5 lies as a rule in the same frequency range as the received oscillations of the intermediate station, but for reasons of the decoupling of the transmitter and receiver of the intermediate station, they are in practice always mutually shifted or displaced by a fixed frequency value. This frequency value lies, for instance in the case of directional radio systems for the 6 gigacycle, in the region of 252 megacycles. In the customary intermediate stations, in order to avoid disturbing frequency fluctuations, both, the conversion oscillation for the receiving converter 2 and the conversion oscillations for the transmitting converter 5, are derived from a common oscillator 8, the feeding of the two converters being, for the decoupling, effected by a decoupling circuit 9, for instance a directional coupler, a magic-T or a hybrid ring.

In order to assure the frequency shift necessary for the decoupling of input and output of the intermediate stations, another frequency converter 10 is inserted into the feed line to the frequency converter 2. This frequency converter 10 is fed by a shifter-frequency oscillator 11 and the heterodyne product of the required frequency level is taken from the output of the frequency converter 10 via a band-pass filter 12 as conversion oscillation for the converter 2.

In accordance with the invention, the shifter-frequency oscillator 11 is constructed as a free running oscillator which has an additional frequency modulation device 24. Additional intelligence can be fed to this frequency modulator 24 via the feed line 13, for the frequency modulation of the oscillator 11. This additional intelligence, for example, can come from 300 telephone channels which are to be additionally fed into the link at the intermediate station. To the shifter-frequency oscillator 11 is also assigned a frequency adjustment which comprises a frequency discriminator 15, a low-pass filter 16 and a frequency regulating motor 17, or the like. Energy is fed to the frequency discriminator 15 from the output of the shifter-frequency oscillator 11. The frequency discriminator 15 is of high frequency stability and its center frequency is tuned to the desired frequency of the shifter-frequency oscillator 11. Upon deviations of the center frequency of the shifter-frequency oscillator 11 from the desired frequency, there occurs at the output of the frequency discriminator 15 a control voltage which is positive or negative, depending on the direction of the deviation in frequency. In order to avoid that the additionally fed intelligence does not affect the frequency regulation 17 of the shifter-frequency oscillator 11, there is interposed between the actual frequency regulating member 17 and the frequency discriminator 15 the low-pass filter 16, the upper cutoff frequency of which is preferably substantially lower than the lowest frequency of the portion of the baseband fed via 13. This low-pass filter can also be combined with the frequency regulating member 17. This is for instance possible by using as actual frequency regulating member 17 a relatively inert re-setting motor which acts by itself as correspondingly dimensioned low-pass filter.

A particularly advantageous embodiment of a frequency-stable control circuit for the oscillator 11 is shown in FIG. 2.

The sub-assemblies or component groups 15, 16 and 17 remain, but high frequency energy, derived from the shifter-frequency oscillator 11 and transposed into a lower frequency level, is fed to the frequency discriminator 15. For this purpose, a quartz-stabilized oscillation of for instance 14.8 megacycles is taken from the oscillator 8 which is in known manner stabilized in frequency, for instance, by means of a frequency readjustment with the aid of an oscillating crystal, said oscillation being multiplied for instance fifteen times in stage 25 The fifteenth harmonic of for instance about 14.8 megacycles, has a frequency of about 222 megacycles and is fed, in addition to the frequency of about 252 megacycles of the shifter frequency oscillator 11, to a heterodyning stage 26, from the output of which is taken the difference frequency of about 30 megacycles, which is via a selective amplifier 27 fed to the frequency discriminator 15. The latter can be made highly stable in this frequency range with the aid of simple elements, namely, concentrated capacitances and inductances. The dimensioning is advantageously such that the discriminator has as linear a characteristic as possible over the entire frequency range, in which side bands of the modulation can occur.

Upon providing, in a system according to the invention, as baseband range, a frequency range of between about 60 kilocycles and about 8.2 megacycles, it is advisable to keep free or reserve in the transmitting station 18, for example, the baseband frequency range between about 60 kilocycles and about 1.3 megacycles, for the introduction of the intelligence from 300 telephone channels in the intermediate station via the terminal 13. The respective intelligence is then fed in the baseband frequency between about 60 kilocycles and about 1.3 megacycles into the terminal 13 of the modulator 24.

The system according to the invention thus makes it possible to feed additional intelligence at intermediate stations with relatively little expenditure while maintaining the shifter technique and satisfying the high requirements as to accuracy of frequency.

In the case of a directional radio link containing a very large number of intermediate stations, the problem can at times arise that additional intelligence from baseband channels is to be inserted at centrally located intermediate stations and that not all portions of the baseband which were occupied in the preceding portions of the link must be conducted to the end of the entire link. Gaps can thus be produced for the feeding of additional intelligence in the baseband, by removing in known manner, in a preceding station, baseband channels which are not to extend over the entire link, thereby freeing the corresponding baseband frequency regions for subsequent reinsertion of intelligence from other channels.

Changes may be made within the scope and spirit of the appended claims which define what is believed to be new and desired to have protected by Letters Patent.

I claim:

1. A directional radio system with angle modulation, containing at least one intermediate station, comprising a common oscillator having first and second outputs, a receiving converter means connecting said receiving converter to said oscillator, said receiving converter mixing an input thereto with said first output of said oscillator to provide an intermediate frequency signal at an output thereof, to an intermediate frequency, means for amplifying the intermediate frequency output signal of said receiving converter, a transmitting converter, said connecting means connecting said transmitting converter to said oscillator, said transmitting converter mixing an input thereto with said second output of said oscillator to provide a signal for transmission at an output thereof, said connecting means including a third frequency converter connected between said common oscillator and one of said receiving and transmitting converters, a shifter-frequency oscillator operatively connected to said third frequency converter whereby said first and second outputs of said common oscillator are shifted in frequency with respect to each other by the operating frequency of said shifter-frequency oscillator and the transmitting frequency is correspondingly shifted with respect to the receiving frequency, means operatively connected to said shifter-frequency oscillator for frequency modulating an output thereof, said modulation means forming the input for additional intelligence to be inserted in the transmission, with such modulation being operative to provide a frequency range which corresponds to a frequency range of the transmission baseband of an intermediate preceding station which range was thereat maintained free of intelligence, a frequency regulating device for said shifter-frequency oscillator, said device comprising a frequency regulating member operatively connected to said shifter-frequency oscillator and operable independently of said modulation means, a discriminator to the input of which is fed a signal derived from the output of said shifter-frequency oscillator, and a low-pass filter operatively connecting said discriminator and said regulating member over which the frequency regulation voltage for the shifter-frequency oscillator is conducted, said low-pass filter having a cut-off frequency which is lower than the lowest frequency of the base-band of the directional radio system.

2. A directional radio system according to claim 1, comprising in further combination a fourth frequency converter, means for multiplying an output of said common oscillator and feeding the multiplied oscillation to said fourth frequency converter, means connecting said shifter oscillator to said fourth converter for producing an intermediate frequency signal at an output thereof, and an amplifier connecting said fourth converter and said frequency discriminator which is tuned to the output of said fourth converter.

3. A directional radio system according to claim 1, comprising means operatively connected to said shift-frequency oscillator for converting an output of said shifter-frequency oscillator to a lower frequency, the output of said last mentioned means being operatively connected to said discriminator.

4. A directional radio system according to claim 1, wherein said modulator is constructed to provide a frequency range which corresponds to the portion of the transmission base-band of lowest frequency, which portion is maintained free of intelligence at all preceding stations.

5. A directional radio system according to claim 4, comprising means operatively connected to said shifter frequency oscillator for converting an output of said shifter-frequency oscillator to a lower frequency, the output of said last mentioned means being operatively connected to said discriminator.

References Cited by the Examiner

UNITED STATES PATENTS

| | | | |
|---|---|---|---|
| 2,228,815 | 1/1941 | Deerhake | 325—11 |
| 2,407,212 | 8/1946 | Tunick | 325—7 |
| 2,477,570 | 8/1949 | Berg | 325—11 X |
| 2,529,579 | 11/1950 | Thompson | 231—30 X |

FOREIGN PATENTS

| | | |
|---|---|---|
| 1,113,720 | 9/1961 | Germany. |

DAVID G. REDINBAUGH, *Primary Examiner.*

BENEDICT V. SAFOUREK, *Assistant Examiner.*